(12) United States Patent
Naka

(10) Patent No.: US 7,486,315 B2
(45) Date of Patent: Feb. 3, 2009

(54) IMAGE SENSING APPARATUS AND CONTROL METHOD THEREFOR

(75) Inventor: Yasutaka Naka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 660 days.

(21) Appl. No.: 10/833,126

(22) Filed: Apr. 28, 2004

(65) Prior Publication Data

US 2005/0174459 A1 Aug. 11, 2005

(30) Foreign Application Priority Data

Feb. 6, 2004 (JP) ............................. 2004-031410

(51) Int. Cl.
H04N 5/262 (2006.01)
(52) U.S. Cl. .............................. 348/240.99; 348/333.01
(58) Field of Classification Search ............ 348/240.99, 348/240.3, 240.1, 333.05, 333.01; 396/72, 396/374; 345/173
See application file for complete search history.

(56) References Cited

U.S. PATENT DOCUMENTS

| | | | | |
|---|---|---|---|---|
| 4,825,237 A * | 4/1989 | Hatase et al. | ................. | 396/79 |
| 5,905,530 A * | 5/1999 | Yokota et al. | .......... | 348/240.99 |
| 5,923,908 A * | 7/1999 | Schrock et al. | ............... | 396/85 |
| 6,380,929 B1 * | 4/2002 | Platt | ........................... | 345/173 |
| 6,690,365 B2 * | 2/2004 | Hinckley et al. | ............. | 345/173 |
| 6,707,449 B2 * | 3/2004 | Hinckley et al. | ............. | 345/173 |
| 6,727,954 B1 * | 4/2004 | Okada et al. | ................ | 348/374 |
| 6,853,808 B1 * | 2/2005 | Yasuda et al. | ................. | 396/72 |
| 6,963,366 B2 * | 11/2005 | Okawara | ................ | 348/240.99 |
| 7,075,513 B2 * | 7/2006 | Silfverberg et al. | ......... | 345/157 |
| 7,154,544 B2 * | 12/2006 | Kowno et al. | .......... | 348/240.99 |
| 7,212,189 B2 * | 5/2007 | Shaw et al. | ................... | 345/163 |
| 2001/0019659 A1 * | 9/2001 | Hirai | ........................... | 386/83 |
| 2002/0041334 A1 * | 4/2002 | Okawara | ..................... | 348/335 |
| 2003/0151687 A1 * | 8/2003 | Yoshida | .................. | 348/333.03 |
| 2004/0012695 A1 * | 1/2004 | Itsukaichi | ................ | 348/240.1 |
| 2004/0090546 A1 * | 5/2004 | Doron | ...................... | 348/240.1 |

FOREIGN PATENT DOCUMENTS

JP 11-308490 A 11/1999

* cited by examiner

Primary Examiner—Lin Ye
Assistant Examiner—Amy Hsu
(74) Attorney, Agent, or Firm—Fitzpatrick, Cella, Harper & Scinto

(57) ABSTRACT

An image sensing apparatus having an image sensing mode for electrically sensing an object and storing an acquired image and a reproduction mode for reproducing and displaying the stored image includes a view angle changing unit for changing an angle of view of an image to be sensed in the image sensing mode and a magnification of an image to be displayed in the reproduction mode, a control unit that, in the reproduction mode, maintains the magnification of the image unchanged from before a start of operation of the view angle changing unit until an extent of operation of the view angle changing unit exceeds a preset first threshold value, and changes the magnification of the image depending on the extent of operation if the preset first threshold value is exceeded, and a display unit that displays a reproduction image at a magnification changed by the control unit.

22 Claims, 13 Drawing Sheets

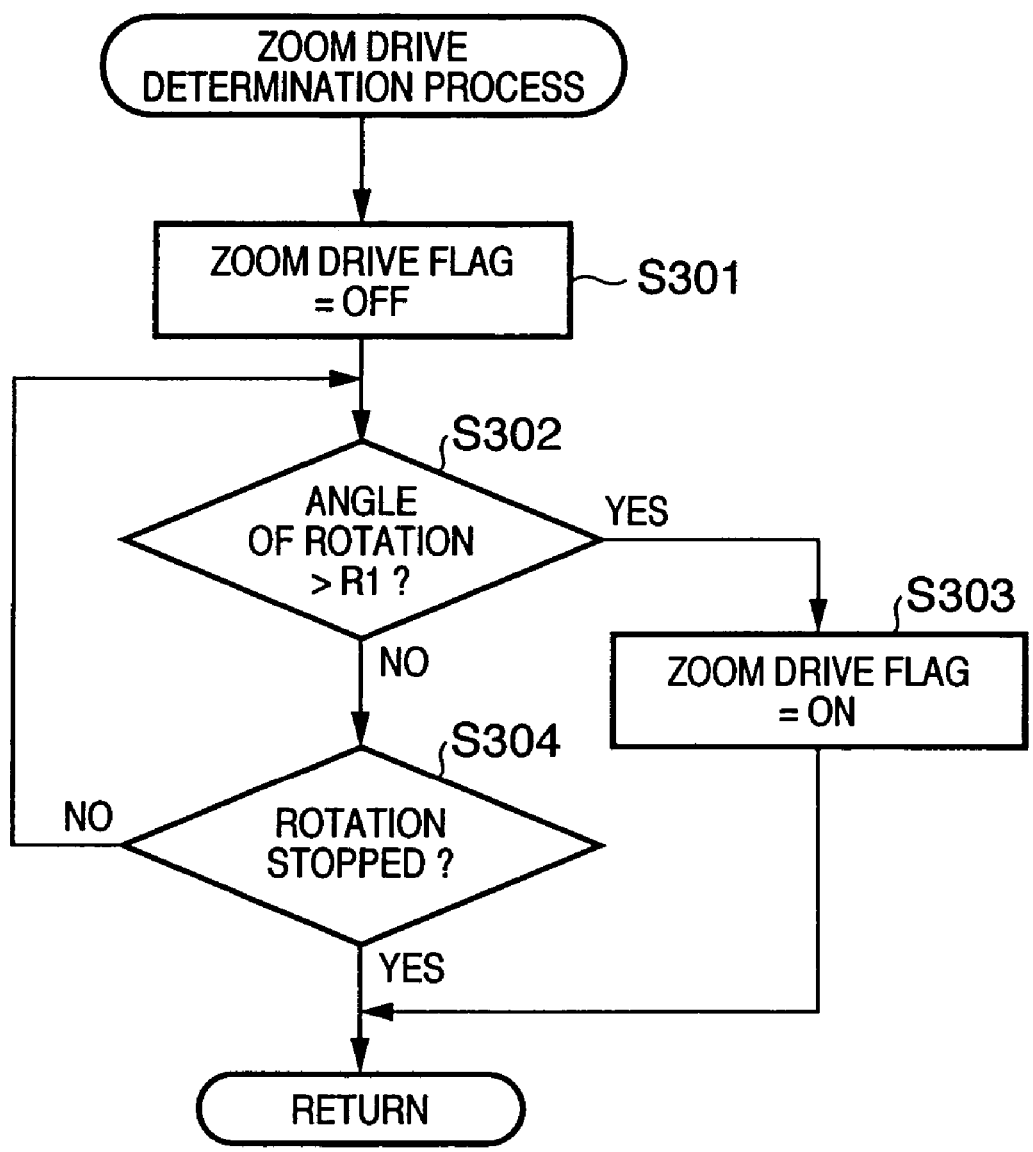

IMAGE SENSING APPARATUS AND CONTROL METHOD THEREFOR

FIELD OF THE INVENTION

The present invention relates to an image sensing apparatus for sensing, recording and reproducing still and moving images, and a control method therefor.

BACKGROUND OF THE INVENTION

Conventionally, there is an image sensing apparatus having an image sensing mode and a reproduction mode as operating modes in which a zoom function in the image sensing mode and an enlarged image reproduction/magnification change in the reproduction mode have been assigned to the same control member. Specifically, in the reproduction mode, when a zoom control member is set to a telephoto side, a magnification of a display image is increased, and when the zoom control member is set to a wide-angle side, the magnification of the display image is decreased. In this manner, a user can perform a reproduction image enlargement designation operation with the same sensation as when performing a zoom operation during image sensing, and for this reason amounts to an instinctively easy-to-understand user interface.

Additionally, a multi-image reproduction function has been proposed that can display a plurality of reduced images on a single display screen and select the image that the user wishes to display in the full screen size when the zoom control member is moved to the wide-angle side (for example, Japanese Patent Application Laid-Open No. 11-308490).

A speedy response to user operations is required of the zoom operation in the image sensing mode, as is the ability to precisely adjust the position of the zoom and to respond sensitively to user operations. At the same time, however, because the zoom responds with the same speed as the zoom operation in the image sensing mode if the zoom control member is touched inadvertently during image reproduction in the reproduction mode, a display operation that is unsatisfactory to the user is executed. Accordingly, a first drawback of the conventional art arises if the zoom operation in the reproduction mode is performed with the same sensitive response as the zoom operation in the image sensing mode, in that a user interface in the reproduction mode that is satisfactory to the user cannot be provided.

Moreover, when performing multi-image reproduction in the reproduction mode, processing time increases because a plurality of recorded images are scanned from a storage medium and displayed. Therefore, a second drawback arises if the zoom control member is touched inadvertently, in that the apparatus becomes unable to accept user operations while performing the multi-image reproduction.

Further, a third drawback arises in that, when a zoom ring is used as the zoom control member, users often mistakenly rotate the zoom ring in the wrong direction, with the result that, if the zoom ring is mistakenly rotated in the wide-angle direction during full screen size image display, or if the zoom ring is mistakenly rotated by a great amount in the wide-angle direction during magnified display, the apparatus shifts to the multi-image reproduction process against the wishes of the user and the user must then wait for the process to be completed.

SUMMARY OF THE INVENTION

The present invention has been made in consideration of the above-described situation, and has as its object to improve the operability of the image sensing apparatus by performing image enlargement and reduction display control according to the operating mode.

According to the present invention, the foregoing object is attained by providing an image sensing apparatus having an image sensing mode for electrically sensing an object and storing acquired image data on a storage medium and a reproduction mode for reproducing and displaying the stored image, the apparatus comprising: a view angle changing unit for designating an angle of view of an image to be sensed in the image sensing mode and a magnification of an image to be displayed in the reproduction mode; a control unit that, in the reproduction mode, maintains the magnification of the image at a value prior to a start of operation of the view angle changing unit since the start of operation until an extent of operation of the view angle changing unit exceeds a preset first threshold value, and changes the magnification of the image depending on the extent of operation if the first threshold value is exceeded; and a display unit that displays a reproduction image at a magnification changed by the control unit.

According to the present invention, the foregoing object is also attained by providing a method of controlling an image sensing apparatus having an image sensing mode for electrically sensing an object and storing acquired image data on a storage medium and a reproduction mode for reproducing and displaying the stored image, a view angle changing unit for setting an angle of view of an image to be sensed in the image sensing mode and a magnification of an image to be displayed in the reproduction mode, and a display unit that displays a reproduction image, the control method comprising: determining an operating mode of the image sensing apparatus; detecting an operating state of the view angle changing unit; in the reproduction mode, maintaining a view angle of the image at a value prior to a start of operation of the view angle changing unit since the start of operation until an extent of operation of the view angle changing unit exceeds a preset first threshold value, and changing a magnification of the image depending on the extent of operation when the first threshold value is exceed; and displaying a reproduction image at the display unit at a magnification changed in the controlling.

Other features and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a flow chart showing details of a zoom drive determination process according to the first embodiment of the present invention;

DETAILED DESCRIPTION OF THE PREFERRED EMBODIMENTS

Preferred embodiments of the present invention are now described in detail in accordance with the accompanying drawings. However, it should be understood that the dimensions, materials, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
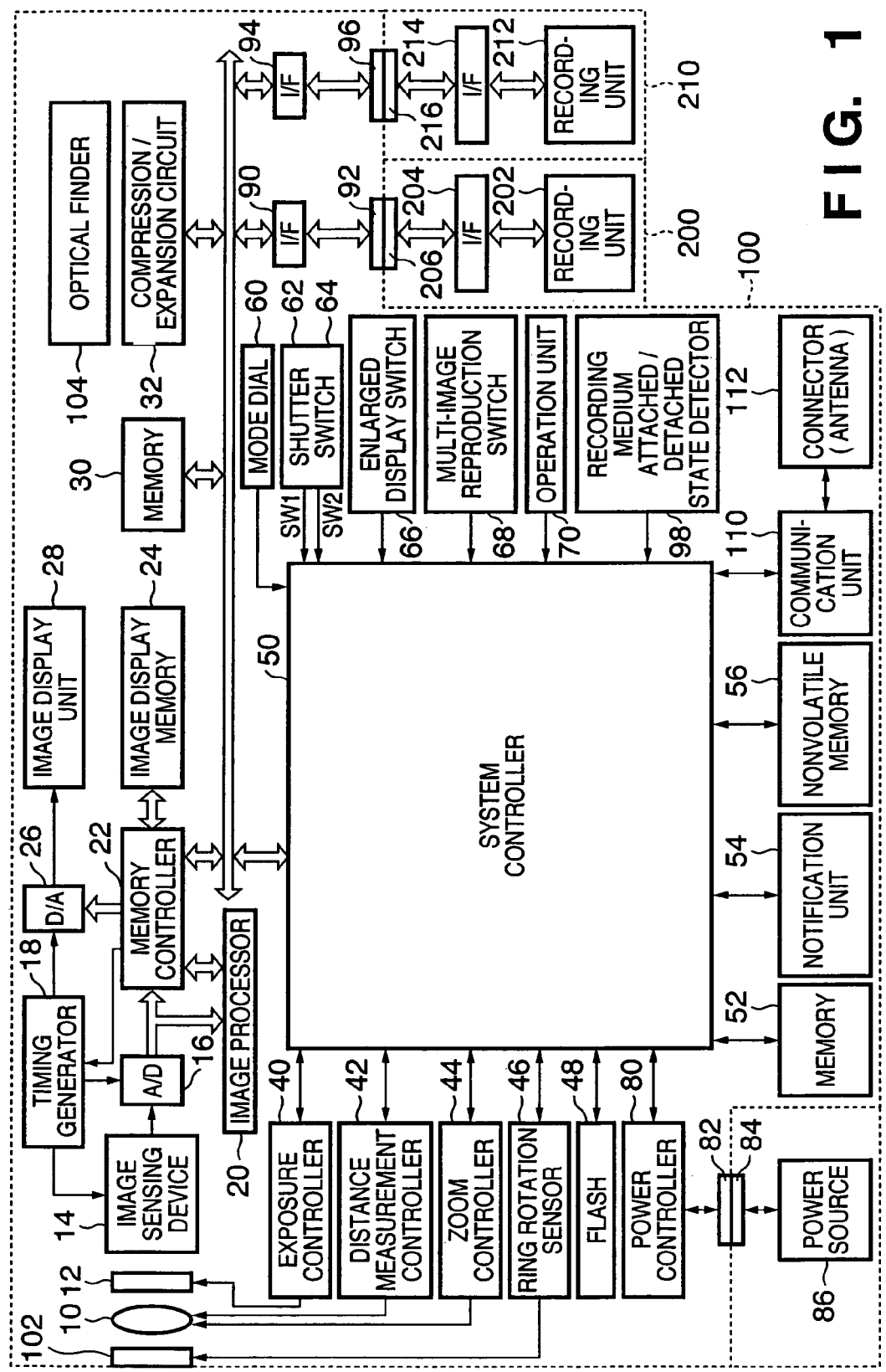
FIG. 1 is a block diagram showing the structure of an image processing apparatus according to a first embodiment of the present invention.

FIG. 1 is a block diagram showing the structure of an image processing apparatus according to a first embodiment of the present invention.

In FIG. 1, reference numeral 100 denotes the image processing apparatus according to the present embodiment. The image processing apparatus 100 may be any of a digital camera, a digital video camera, and a camera-equipped portable terminal (including a cell phone equipped with a camera.) In the present embodiment, the image processing apparatus 100 is assumed to be a digital camera.

In the image sensing apparatus 100, 10 denotes an image sensing lens; 12, a shutter having a diaphragm function; 14, an image sensing device which converts an optical image into an electric signal; 16, an A/D converter which converts an analog signal output from the image sensing device 14 into a digital signal.

Numeral 18 denotes a timing generator which supplies a clock signal and a control signal respectively to the A/D converter 16 and a D/A converter 26, under the control of a memory controller 22 and a system controller 50.

Numeral 20 denotes an image processor which performs predetermined pixel interpolation processing, color conversion processing and the like on image data from the A/D converter 16 or image data from the memory controller 22. The image processor 20 performs predetermined calculation processing using the image data outputted from the A/D converter 16, and the system controller 50 performs through-the-lens (TTL) auto focus (AF) processing, auto exposure (AE) processing, pre-flash (EF) processing with respect to an exposure controller 40 and a distance measurement controller 42, based on the result of calculations. Further, the image processor 20 performs predetermined calculation using the image data outputted from the A/D converter 16, and performs TTL auto white balance (AWB) processing, based on the result of calculations.

The memory controller 22 controls the A/D converter 16, the timing generator 18, the image processor 20, an image display memory 24, the D/A converter 26, a memory 30 and a compression/expansion circuit 32. The image data outputted from the A/D converter 16 is written into the image display memory 24 or the memory 30 via the image processor 20 and the memory controller 22, or only via the memory controller 22.

Numeral 24 denotes the image display memory; 26, a D/A converter; and 28, an image display unit comprising an LCD or the like. Image data written into the image display memory 24 is displayed on the image display unit 28 via the D/A converter 26.

An electronic finder function is realized by sequentially display obtained images on the image display unit 28. Further, image display unit 28 arbitrarily turns ON/OFF its display, in accordance with an instruction from the system controller 50. If the display is turned OFF, the electric consumption of the image processing apparatus 100 can be greatly reduced. The image display unit 28 also displays information on a focus state, a camera shake warning, a flash charge state, the shutter speed, the f number (aperture), and the exposure compensation in accordance with an instruction from the system controller 50.

The memory 30, used for storing obtained still images and moving images, has a sufficient storage capacity for storing a predetermined number of still images and a moving image for a predetermined period. In sequential image sensing to sequentially obtain a plural number of still images or panoramic images sensing, a large amount of image data can be written into the memory 30 at a high speed. Further, the memory 30 may be used as a work area for the system controller 50.

The compression/expansion circuit 32 compresses or expands image data by adaptive discrete cosine transformation (ADCT) or the like. The compression/expansion circuit 32 reads image data stored in the memory 30 and performs compression or expansion processing on the read image data, and writes the processed data into the memory 30.

The exposure controller 40 controls the shutter 12 having the diaphragm function. The exposure controller 40 interlocked with a flash 48 also has a flash adjusting function. The distance measurement controller 42 controls focusing of the image sensing lens 10. Numeral 44 denotes a zoom controller which controls zooming of the image sensing lens 10. Numeral 102 denotes a zoom ring which incorporates an encoder and outputs a pulse signal in response to a rotation of the zoom ring 102; 46, a ring rotation sensor which detects the direction and angle of the rotation of the zoom ring 102 in accordance with the output signal from the encoder of the zoom ring 102; and 48, the flash which has an AF auxiliary light projection function and a flash adjusting function. The system controller 50 controls the exposure controller 40 and the distance measurement controller 42 by the TTL method, in accordance with the result of calculations by the image processor 20 based on the image data from the A/D converter 16.

The system controller 50 controls the overall image sensing apparatus 100. Memory 52 stores the constants, variables, and programs for operation of the system controller 50.

Numeral 54 denotes a notification unit which notifies operating statuses, messages and the like to the outside by using characters, images, sound and the like, in correspondence with execution of program by the system controller 50. The notification unit 54 comprises one or more combinations of display devices including an LCD and an LED for visual notification and sound generating devices for audio notification. Especially, the display device or devices is/are provided in a single or plural visually-recognizable positions around an operation unit 70 of the image processing apparatus 100. Further, a part of functions of the notification unit 54 is provided within an optical finder 104.

The display contents of the notification unit 54, displayed on the LCD or the like, include indication of single shot/sequential image sensing, a self timer, a compression rate, the number of recording pixels, the number of recorded images, the number of recordable images, a shutter speed, an f number (aperture), exposure compensation, flash illumination, pink-eye effect mitigation, macro image sensing, a buzzer-set state, a timer battery level, a battery level, an error state, information of plural digit numbers, attached/detached status of recording media 200 and 210, operation of communication I/F, and date and time.

Further, the display contents of the notification unit 54, displayed within the optical finder 104, include a focus state, a camera shake warning, a flash charge state, the shutter speed, the f number (aperture), and the exposure compensation.

Numeral 56 denotes an electrically erasable and recordable nonvolatile memory such as an EEPROM.

Numerals 60, 62, 64, 66, 68 and 70 denote operation means for inputting various operation instructions to the system controller 50, comprising a single or plurality of combinations of switches, dials, touch panels, a device for pointing by line-of-sight detection, a voice recognition device, and the like. The subsystem controller 52 detects the operation content and transmits the content to the system controller 50 by communication.

Next, the operation means will be described in more detail.

Numeral 60 denotes a mode dial switch for selecting various function modes such as a power OFF mode, an automatic image sensing mode, an image sensing mode, a panoramic image sensing mode, a reproduction mode, a multi-image reproduction/deletion mode, and a PC connection mode.

Numeral 62 denotes a shutter switch SW1 turned ON by half stroke of a shutter button (not shown), to instruct start of the operations of the AF processing, the AE processing, the AWB processing, the EF processing and the like.

Numeral 64 denotes a shutter switch SW2 turned ON by full stroke of the shutter button (not shown), to instruct start of a series of operations of exposure processing to write a signal read from the image sensing device 14 into the memory 30, via the A/D converter 16 and the memory controller 22, development processing by using calculations by the image processor 20 and the memory controller 22, and recording processing to read the image data from the memory 30, compress the image data by the compression/expansion circuit 32, and write the compressed image data into the recording medium 200 or 210.

An enlarged display switch 66 instructs to enlarge a reproduction image by JPEG method and display the enlarged image. When it is operated during a multi-reproduction mode, a selected image is displayed in the full screen size.

A multi-image reproduction switch 68 instructs to reduce a magnification ration ratio of a reproduction image and display the reduced image. When it is operated during displaying an image in the full screen size, the mode is shifted to the multi-image reproduction mode in which a plurality of thumbnail images are displayed on a single display screen.

Numeral 70 denotes an operation unit comprising various buttons and touch panels including a menu button, a set button, a macro/non-macro selection button, a multi-image reproduction/repaging button, a quick review on/off button, a flash setting button, a single-shot/sequential/self-timer image sensing selection button, a forward (+) menu item selection button, a backward (−) menu item selection button, a forward (+) reproduction image search button, a backward (−) reproduction image search button, an image sensing quality selection button, an exposure correction button, and a date/time set button.

Numeral 80 denotes a power controller comprising a battery detection circuit, a DC-DC converter, a switch circuit to select the block to be energized and the like. The power controller 80 detects the attached/detached state of the battery, the battery type and the remaining battery power level, controls the DC-DC converter based on the results of detection and an instruction from the system controller 50, and supplies a necessary voltage to the respective parts including the recording medium for the necessary period.

Numerals 82 and 84 denote connectors; and 86, the power source comprising a primary battery such as an alkaline battery or a lithium battery, a secondary battery such as an NiDd battery, an NiMH battery or an Li battery, an AC adapter, and the like.

Numerals 90 and 94 denote interfaces for recording media such as a memory card or a hard disk; and 92 and 96, connectors for connection with the recording media such as a memory card or a hard disk. A recording medium attached/detached state detector 98 detects whether recording medium 200 and/or 210 is attached to the connector 92 and/or connector 96.

In the present embodiment, two systems of interfaces and connectors for connection with the recording media are employed. However, the number of systems is not limited, and a single or plurality of systems of interfaces and connectors may be provided. Further, interfaces and connectors pursuant to different standards may be combined.

As the interfaces and connectors, cards in conformity with Personal Computer Memory Card International Association standards (PCMCIA cards) and cards in conformity with compact flash© (CF) card standards may be used. In a case where cards and connectors in conformity with the PCMCIA standards, CF card standards and the like are used as the interfaces 90 and 94 and the connectors 92 and 96, image data and management information attached to the image data are transmitted/received with respect to other peripheral devices such as a computer and a printer by connection with various communication cards such as a LAN card, a modem card, a USB card, an IEEE 1394 card, a P1284 card, an SCSI card and a PHS card.

The optical finder 104 can be used for image sensing without the electronic finder function by the image display unit 28. In the optical finder 104, realized are some of the functions of the notification unit 54 including the indication of focus state, the camera shake warning, the flash charge state, the shutter speed, the f number (aperture), the exposure compensation and the like.

A communication unit 110 has various communication functions for RS232C, USB, IEEE 1394, P1284, SCSI, modem, LAN, and wireless communication. A connector/antenna 112 functions as a connector when the image processing apparatus 100 is connected to another device via the communication unit 110, and as an antenna for wireless communication.

The recording media 200 and 210 comprise memory cards, hard disks or the like. The recording media 200 and 210 have recording units 202 and 212 of a semiconductor memory, a magnetic disk or the like, the interfaces 204 and 214 for communication with the image processing apparatus 100, and the connectors 206 and 216 for connection with the image processing apparatus 100, respectively.

Next, a description is given of the operation of the image processing apparatus 100 having the structure described above according to the first embodiment of the present invention, with reference to FIGS. 1 to 5.

Figure 2:
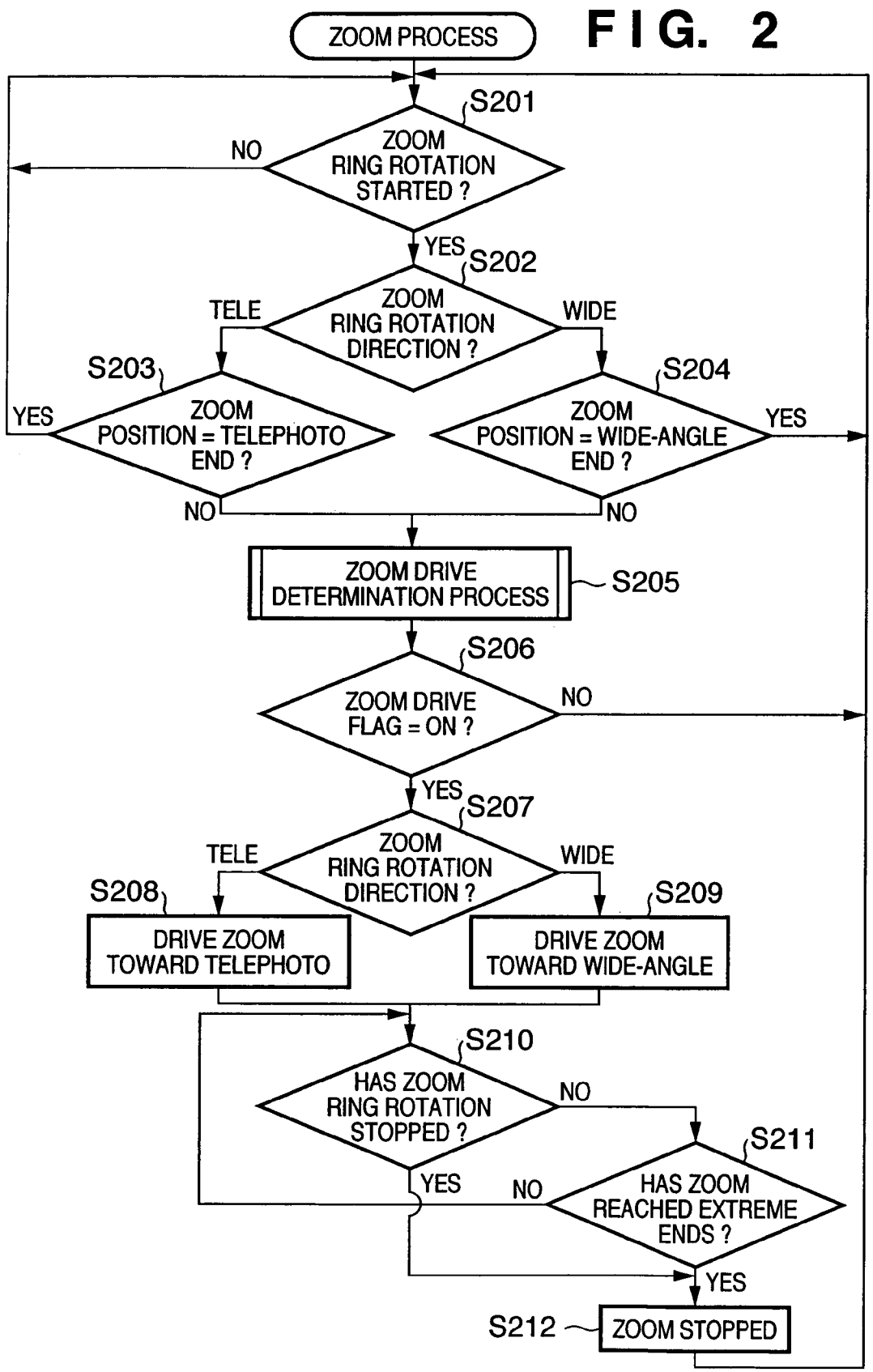
FIG. 2 is a flow chart showing the overall operation of a zoom process in an image sensing mode according to the first embodiment of the present invention.

FIG. 2 is a flow chart showing the overall operation of a zoom process according to an image sensing mode of the first embodiment of the present invention.

In step S201, the ring rotation sensor 46 detects a pulse signal output from the encoder of the zoom ring 102, thus detecting the start of rotation of the zoom ring 102. When the start of rotation of the zoom ring 102 is detected, in step S202 it is determined if the direction of rotation of the zoom ring 102 is in the telephoto direction (zoom-in) or in the wide-angle direction (zoom-out). If the direction of rotation of the zoom ring 102 is in the telephoto direction, then processing proceeds to step S203, where it is determined whether or not the zoom position is at the extreme telephoto end. If the direction of rotation of the zoom ring 102 is in the wide-angle direction, then processing proceeds to step S204, where it is determined whether or not the zoom position is at the extreme wide-angle end.

If the zoom position is at the telephoto end or the wide-angle end, processing returns to step S201. If the zoom position is not at either the telephoto end or the wide-angle end, then processing proceeds to step S205, where it is determined whether or not to begin zoom drive.

FIG. 3 is a flow chart showing details of a zoom drive determination process according to the first embodiment of the present invention, specifically, of the zoom drive determination process performed in step S205.

First, in step S301, the zoom drive flag is initialized to OFF. Next, in step S302, it is determined whether or not the angle of rotation since the start of rotation of the zoom ring 102 has exceeded a preset reference angle of rotation R1, and, if the angle of rotation has exceeded R1, in step S303 the zoom drive flag is turned ON, starting the zoom drive. It should be noted that, in the image sensing mode, it is necessary that the zoom operation responds speedily and sensitively to user operations in order not to miss a shot, and as a result it is preferable to set the reference angle of rotation R1 at a very small value. If the rotation of the zoom ring 102 is stopped (YES in step S304) before the angle of rotation since the start of rotation of the zoom ring 102 exceeds the reference angle of rotation R1 (NO in step S302), then the zoom drive flag is left in the state in which it was set in step S301 (that is, OFF).

If as a result of the zoom drive determination process in step S205 described above the drive start conditions are satisfied, that is, if the zoom drive flag is ON (YES in step S206), then in step S207 the direction of rotation of the zoom ring 102 is determined. If the direction of rotation of the zoom ring 102 is in the telephoto direction, then processing proceeds to step S208 and the zoom position is moved to the telephoto side. If the direction of rotation of the zoom ring 102 is in the wide-angle direction, then processing proceeds to step S209 and the zoom position is moved to the wide-angle side. It should be noted that, in steps S208 and S209, the zoom position is moved in response to the rotation operation from the time when the zoom drive flag is turned ON (that is, from the time when the reference angle of rotation R1 is reached).

In step S206, if the drive start conditions are not satisfied, that is, if the zoom drive flag is OFF, then processing returns to step S201 without performing zoom drive.

If during zoom drive a halt in rotation of the zoom ring 102 is detected (YES in step S210), then in step S212 the zoom drive is stopped. Also, if the zoom position reaches the telephoto end or the wide end (YES in step S211) without a halt in rotation of the zoom ring 102 (NO in step S210), then processing proceeds to step S212 and zoom drive is stopped.

Figure 4A:
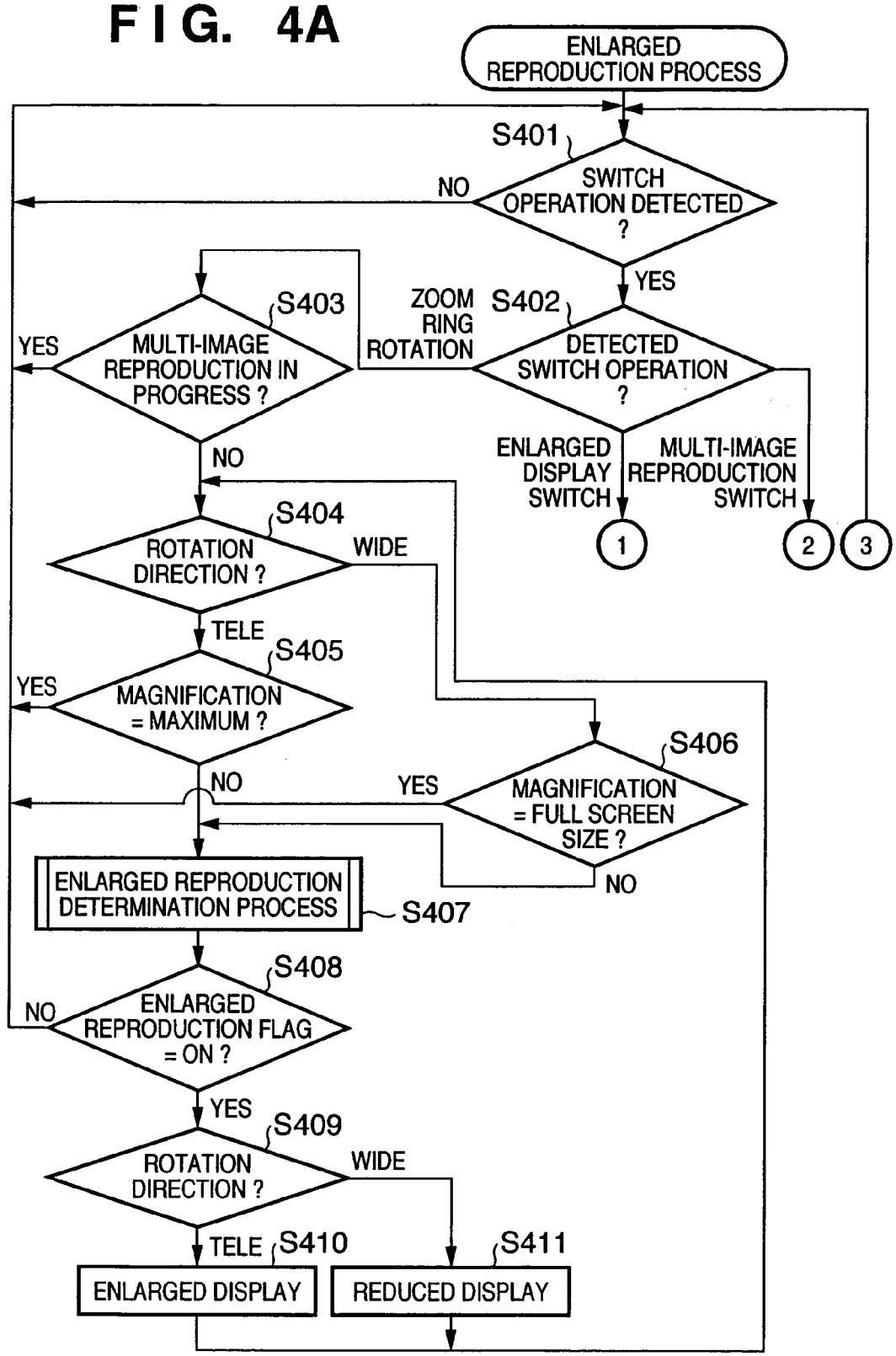
FIGS. 4A and 4B are flow charts showing the overall operation of an enlarged reproduction process in a reproduction mode according to the first embodiment of the present invention.
Figure 4B:
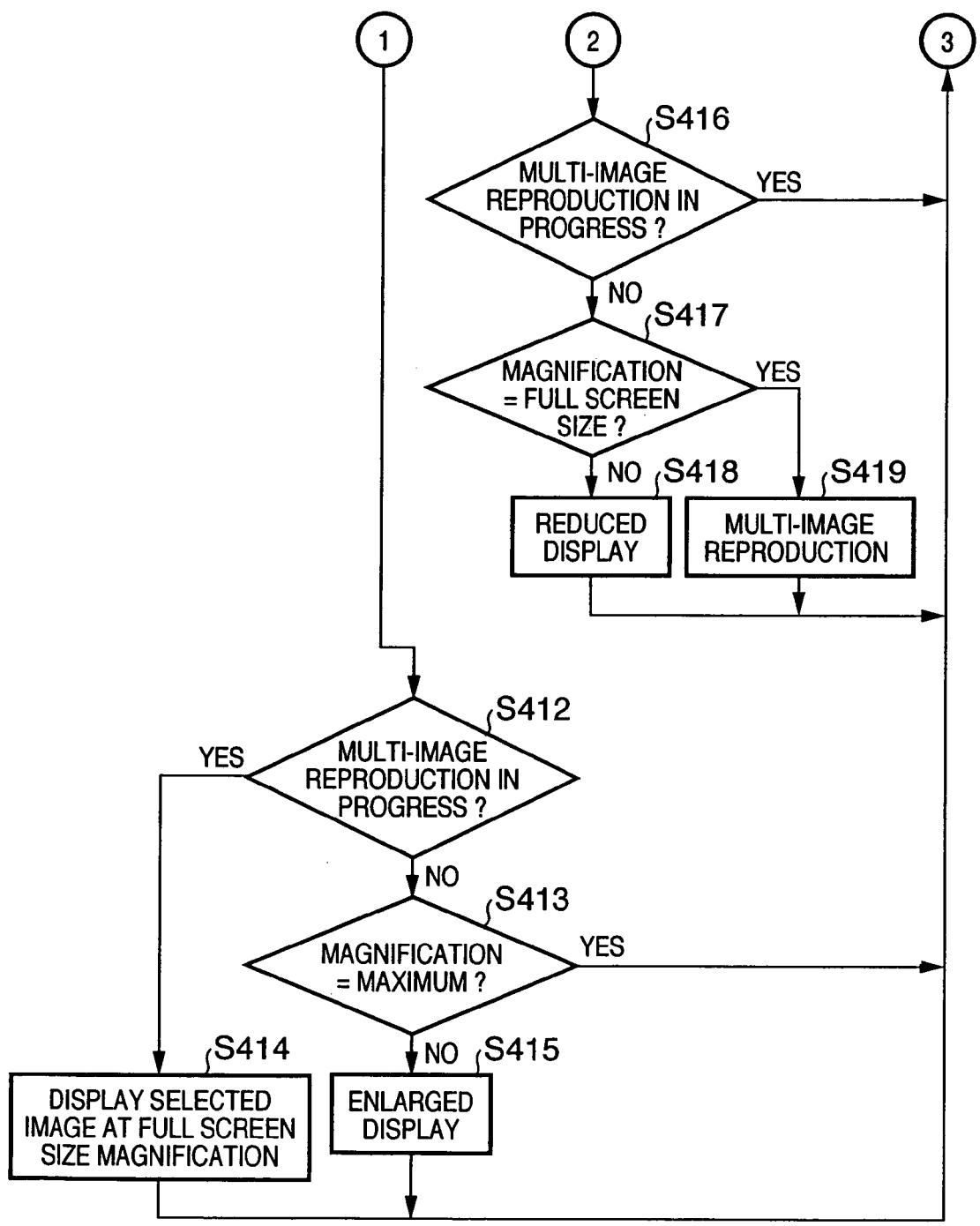

FIGS. 4A and 4B are flow charts showing the overall operation of an enlarged reproduction process in the reproduction mode according to the first embodiment of the present invention.

First, in step S401, it is detected if any of either the enlarged display switch 66, the multi-image reproduction switch 68 or the zoom ring 102 has been operated. If an operation is detected the process proceeds to step S402, where it is determined which operation has been detected. Here, a description is given of the process of switching among image reproduction, enlarged reproduction and multi-image reproduction by the enlarged display switch 66 and multi-image reproduction switch 68.

If in step S402 operation of the enlarged display switch 66 is detected, processing then proceeds to step S412 where it is determined whether or not the apparatus is in multi-image reproduction. If the apparatus is not in multi-image reproduction but in single-image reproduction, then processing proceeds to step S413 where it is determined whether or not the magnification of the displayed image is at maximum. If the image displayed is at maximum magnification, then processing returns to step S401 because further enlarged display is not possible. By contrast, if the image displayed is not at maximum magnification, then the apparatus performs JPEG expansion of the reproduction image in step S415 and display is enlarged. Additionally, if it is determined in step S412 that the apparatus is in multi-image reproduction, then of the plurality of images being displayed, an image being selected is displayed at full screen size magnification.

If in step S402 operation of the multi-image reproduction switch 68 is detected, processing then proceeds to step S416 where it is determined whether or not the apparatus is in multi-image reproduction. If the apparatus is in multi-image reproduction, then processing returns to step S401 without changing the display. By contrast, if the apparatus is not in multi-image reproduction but in single-image reproduction, then processing proceeds to step S417, where it is determined if the image being displayed is at full screen size magnification. If the image is displayed in the full screen size, then processing proceeds to step S419 and the apparatus performs multi-image reproduction. If the image is not displayed at a full screen size magnification, then an enlarged image is displayed, and therefore in step S418 the enlarged magnification is reduced and a single reduced image is displayed.

Next, a process of switching between image reproduction and enlarged reproduction using the zoom ring 102 is described.

If in step S402 operation of the zoom ring 102 is detected, processing then proceeds to step S403 where it is determined whether or not the apparatus is in multi-image reproduction. If the apparatus is in multi-image reproduction, then processing returns to step S401 without changing the display. That is, a change in the display from multi-image reproduction display to single-image display by operation of the zoom ring 102 is not performed.

By contrast, if the apparatus is not in multi-image reproduction (that is, the apparatus is in single-image display), the process proceeds to step S404 and the direction of rotation of the zoom ring 102 is detected. If the direction of rotation of the zoom ring 102 is toward telephoto, then processing proceeds to step S405 and it is determined whether or not the zoom magnification of the image being displayed is at maximum. If the image displayed is not at maximum magnification, then processing proceeds to step S407. If the image displayed is at maximum magnification, then processing returns to step S401 because further enlarged display is not possible. By contrast, if the direction of rotation of the zoom ring 102 is toward wide-angle, processing then proceeds to step S406 and it is determined whether or not the zoom magnification is full screen size magnification. If the zoom magnification is not full screen size magnification, then processing proceeds to step S407. If the zoom magnification is full screen size magnification, then processing returns to step S401. Thus, as the foregoing indicates, a change in the display from single-image display to multi-image reproduction by operation of the zoom ring 102 is not performed.

In step S407, an enlarged reproduction determination process is performed. A description is now given of the enlarged reproduction determination process in the first embodiment of the present invention, with reference to FIG. 5.

Figure 5:
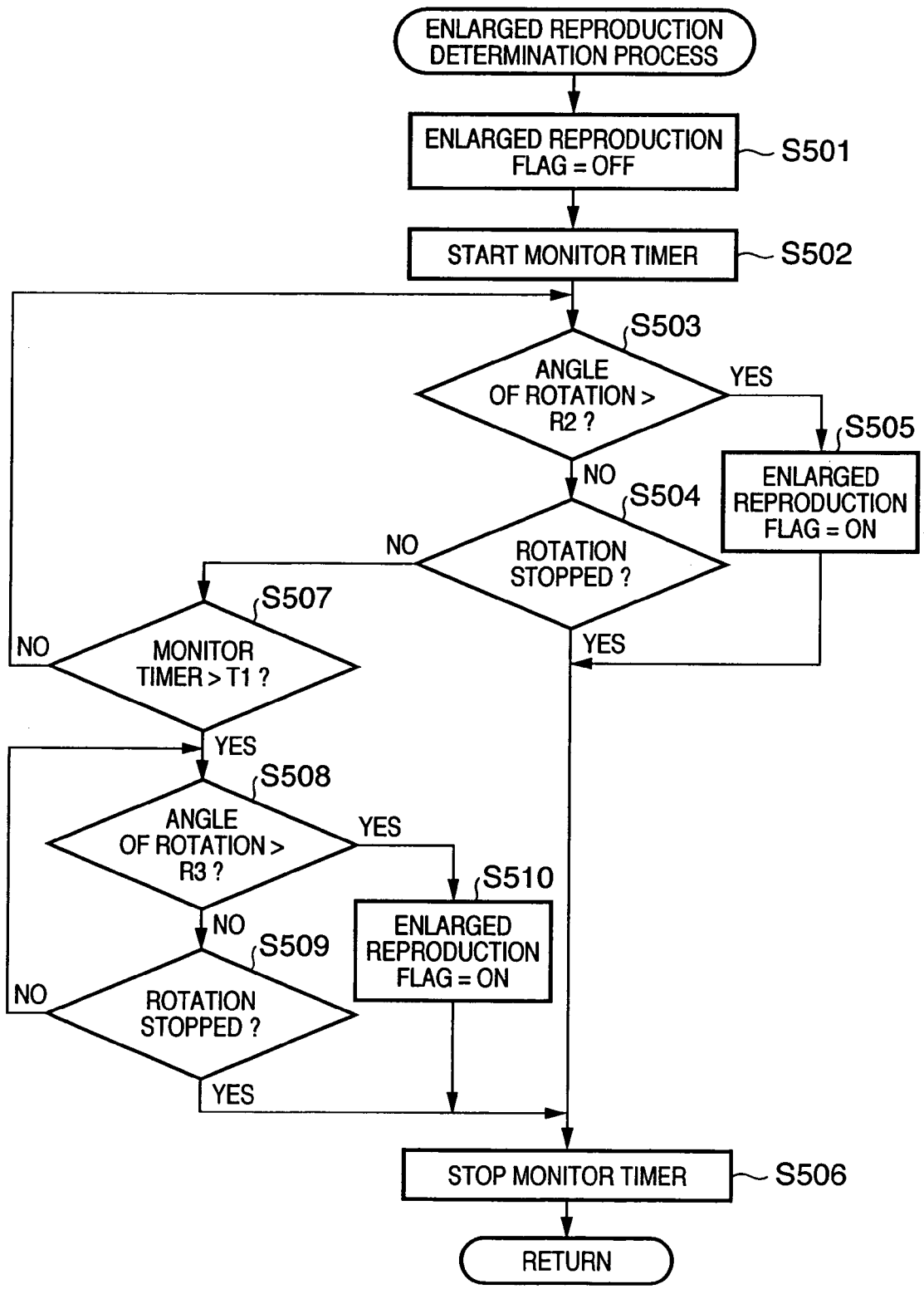
FIG. 5 is a flow chart showing details of an enlarged reproduction determination process according to the first embodiment of the present invention.

FIG. 5 is a flow chart showing details of an enlarged reproduction determination process according to the first embodiment of the present invention.

First, in step S501, the enlarged reproduction flag is initialized to OFF. In step S502, a monitor timer that measures a period of time since the start of rotation of the zoom ring 102 starts. Next, in step S503, it is determined whether or not the angle of rotation of the zoom ring 102 has exceeded a preset reference angle of rotation R2. If the angle of rotation of the zoom ring 102 has exceeded the preset reference angle of rotation R2 (YES in step S503), then the enlarged reproduction flag is turned ON so as to perform enlarged display (step S505). Processing is ended after the monitor timer is stopped in step S506.

It should be noted that the reference angle of rotation R2 used in the enlargement determination process in the reproduction mode is set greater than the reference angle of rotation R1 used in the zoom drive determination process in the image sensing mode. The reason for such a setting arrangement is that, in contrast to the necessity for sensitive reaction to user operation during zoom operation in the image sensing mode, the necessity for sensitive reaction to user operations is less in the reproduction mode than in the image sensing mode because the reproduction mode involves the reproduction of already recorded images. Conversely, if the reproduction mode operated with the same speedy response as the image sensing mode, the user might unintentionally perform an enlargement operation if, for example, the user has inadvertently touched the zoom ring, resulting in an unsatisfactory display operation for the user. Therefore, by setting R2 at a value greater than R1, the extent of driving of the zoom ring 102 until the start of a zoom operation can be made greater in the reproduction mode than in the image sensing mode, so that the possibility of the user performing an unintentional zoom operation if the zoom ring 102 is inadvertently moved can be reduced.

By contrast, if the angle of rotation of the zoom ring 102 is less than R2 (NO in step S503), in step S504 it is determined whether or not the rotation of the zoom ring 102 has stopped. If the rotation has not stopped, then in step S507 it is determined whether or not the monitor timer has exceeded a preset time-out time T1, and, if the preset time-out has not been exceeded, processing returns to step S503 and the detection of the angle of rotation is repeated. By contrast, if the angle of rotation of the zoom ring 102 has not exceeded the reference angle of rotation R2 within the time-out time T1 since the start of rotation of the zoom ring 102 (NO in step S503), and further, if the rotation of the zoom ring 102 has stopped (YES in step S504), then the enlarged reproduction determination process is ended after the monitor timer is stopped in step S506. As a result, the enlarged reproduction flag set in step S501 remains OFF.

Additionally, even if rotation of the zoom ring 102 continues and the zoom ring 102 angle of rotation has not reached the reference angle of rotation R2 within the time-out time T1 since the start of rotation (YES in step S507), if rotation of the zoom ring 102 is continued until the angle of rotation of the zoom ring 102 exceeds a separate reference angle of rotation R3 (NO in step S509, YES in step S508), then the enlarged reproduction flag is set to ON in step S510 so as to perform enlarged reproduction, and after the monitor timer is stopped in step S506 the enlarged reproduction determination process is ended.

It should be noted that the reference angle of rotation R3 is set greater than the reference angle of rotation R2.

By contrast, if rotation of the zoom ring 102 is stopped (YES in step S509) without the angle of rotation of the zoom ring 102 exceeding the reference angle of rotation R3 (NO in step S508), processing then proceeds to step S506 and, after the monitor timer is stopped, the enlarged reproduction determination process is ended. As a result, the enlarged reproduction flag set in step S501 remains OFF, and enlarged reproduction is not performed.

If as a result of the enlarged reproduction determination process in step S407 described above the drive start conditions are not satisfied (NO in step S408), that is, if the enlarged reproduction flag is OFF, processing returns to step S401 without performing enlarged reproduction.

On the other hand, if the drive start conditions are satisfied, that is, if the enlarged reproduction flag is ON (YES in step S408), then in step S409 the direction of rotation of the zoom ring 102 is detected. If the direction of rotation of the zoom ring 102 is toward the telephoto side, then processing proceeds to step S410, where the reproduction image is JPEG expanded, enlarged and displayed. If the direction of rotation of the zoom ring 102 is toward the wide-angle side, processing then proceeds to step S411, where the magnification is reduced and a single image is displayed. It should be noted that, in steps S410 and S411, the magnification is determined according to the rotation operation from the time the zoom drive flag is turned ON (that is, since reaching reference angle of rotation R2 or R3).

After step S410 or S411, processing returns to step S404 and the process described above is repeated. By so doing, if the enlargement magnification is maximized as a result of moving the zoom ring 102 further in the telephoto direction, if the enlargement magnification becomes full screen size magnification by moving the zoom ring 102 further in the wide-angle direction, or if the rotation of the zoom ring 102 has stopped, the enlarged reproduction process is stopped and processing returns to step S401.

According to the first embodiment described above, by setting the reference angle of rotation R1 of the zoom ring 102 at a very small value in the image sensing mode, the driving of the zoom can be started promptly in response to the rotation of the zoom ring 102. At the same time, if in the reproduction mode the angle of rotation is rotated at or above a fixed angular velocity (R2/T1, R2>R1), or if rotated greatly though at a slow angular velocity (angle of rotation>R3), the apparatus determines that enlarged reproduction is to be performed, and as a result the possibility that the user might perform an unintentional zoom operation by inadvertently moving the zoom ring 102 can be reduced.

Additionally, by configuring the apparatus so that, in the reproduction mode, the shift from multi-image reproduction display to single-image reproduction display and the shift from single-image reproduction display to multi-image reproduction display are accomplished by special switch operations and cannot be accomplished by zoom ring operation, the performance of an unintended multi-image reproduction process by inadvertent operation of the zoom ring can be prevented.

It should be noted that, although in the first embodiment described above, the image sensing mode determination logic (FIG. 3) and the reproduction mode determination logic (FIG. 5) are described as being separate, alternatively, a single determination logic may be used and different values for each mode may be used for the reference angle of rotation and monitor timer.

Additionally, although in the first embodiment described above the zoom drive control is provided or not depending on the angle of rotation of the zoom ring even in the image sensing mode, alternatively such operation may not be performed in the image sensing mode.

Second Embodiment

Next, a description is given of a second embodiment of the present invention.

Figure 6:
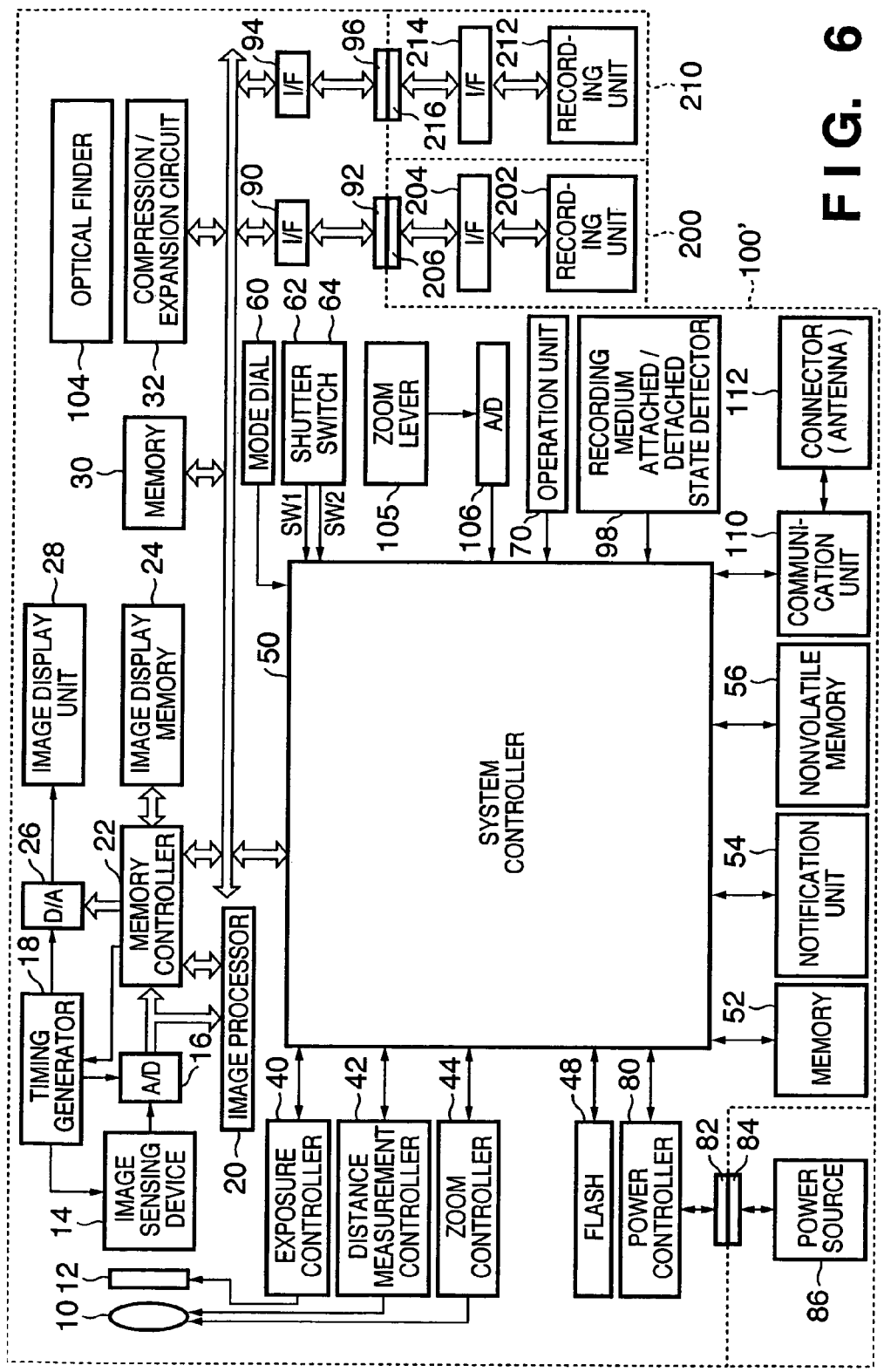
FIG. 6 is a block diagram showing the structure of an image processing apparatus according to a second embodiment of the present invention.

FIG. 6 is a block diagram showing the structure of an image processing apparatus according to a second embodiment of the present invention. Structures in FIG. 6 identical to those in FIG. 1 have identical reference numerals, and a duplicate description thereof is omitted here.

Reference numeral 105 denotes a zoom lever that can be moved both left and right from a center position and is used for zoom, enlarged reproduction, reduced reproduction, and multi-image reproduction operations. A voltage at the AD converter 106 changes depending on how much the lever is operated, and the changed voltage is reported to the system controller 50. The zoom lever 105 and the A/D converter 106 are provided instead of the enlarged display switch 66, the multi-image reproduction switch 67, the zoom ring 102 and the ring rotation sensor shown in FIG. 1. The system controller 50 performs processing control based on the voltage value reported from the A/D converter 106. It should be noted that a possible range of operation of the zoom lever 105 is a range from −A to +A, with 0 as the center position.

Next, a description is given of the operation of an image processing apparatus 100' having the structure shown in FIG. 6 according to the second embodiment of the present invention, with reference to FIGS. 6 to 11.

Figure 7:
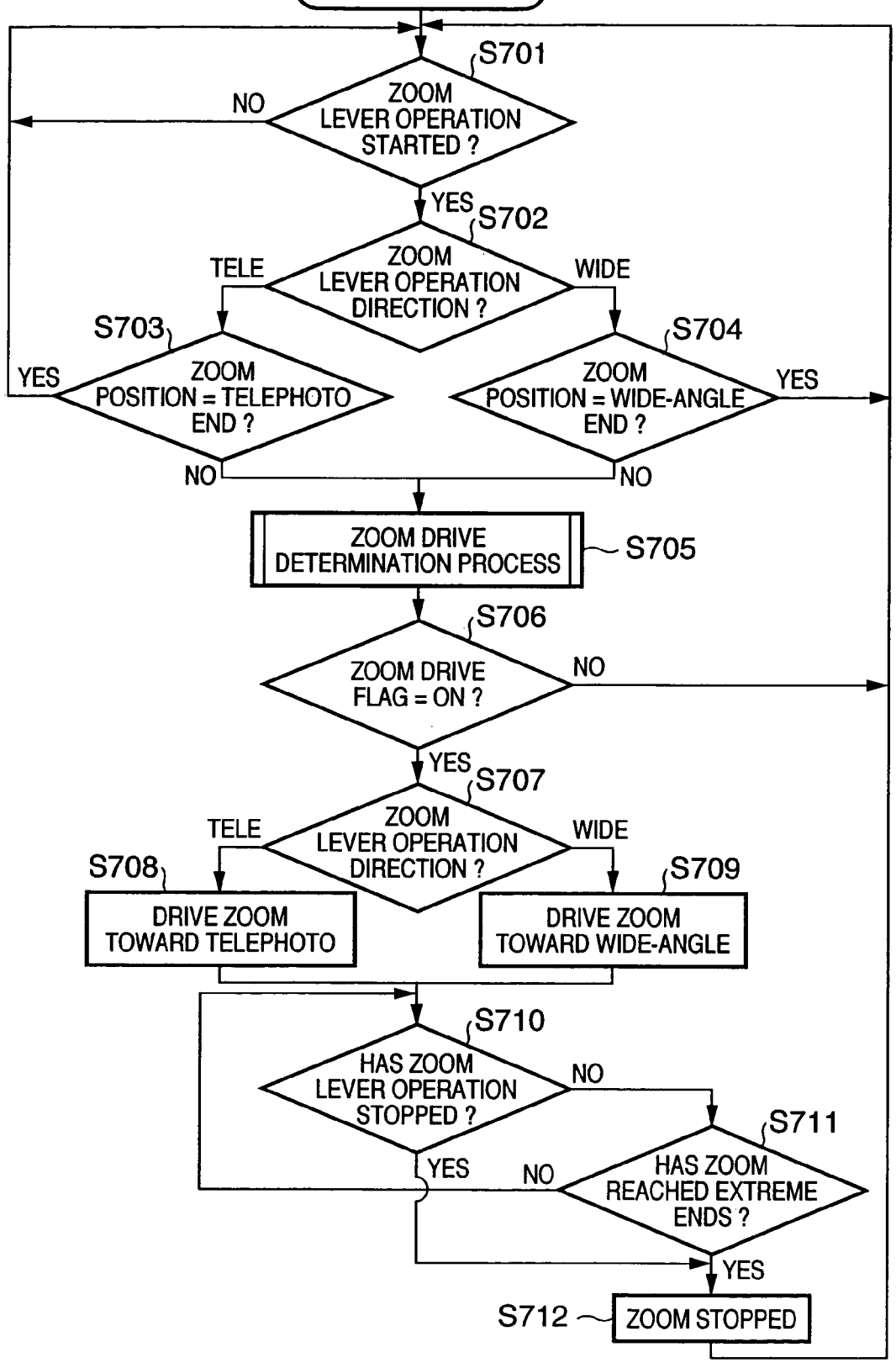
FIG. 7 is a flow chart showing the overall operation of a zoom process in an image sensing mode according to the second embodiment of the present invention.

FIG. 7 is a flow chart showing the overall operation of a zoom process in an image sensing mode according to the second embodiment of the present invention.

In step S701, the system controller 50 detects a start of operation of the zoom lever 105 based on the voltage value from the A/D converter 106. When the start of operation of the zoom lever 105 is detected, in step S702 the system controller 50 determines if the zoom lever 105 has been operated in the telephoto direction (zoom-in) or in the wide-angle direction (zoom-out). If the zoom lever 105 has been operated in the telephoto direction, then processing proceeds to step S703 and the system controller 50 determines whether or not the zoom position is at the extreme telephoto end. If the zoom lever 105 has been operated in the wide-angle direction, processing then proceeds to step S704 and the system controller 50 determines whether or not the zoom position is at the extreme wide-angle end.

If the zoom position is at either the extreme telephoto end or the extreme wide-angle end, then processing returns to step S701. If the zoom position is not at either the telephoto end or the wide-angle end, then processing proceeds to step S705 and the system controller 50 determines whether or not to start the zoom drive.

Figure 8:
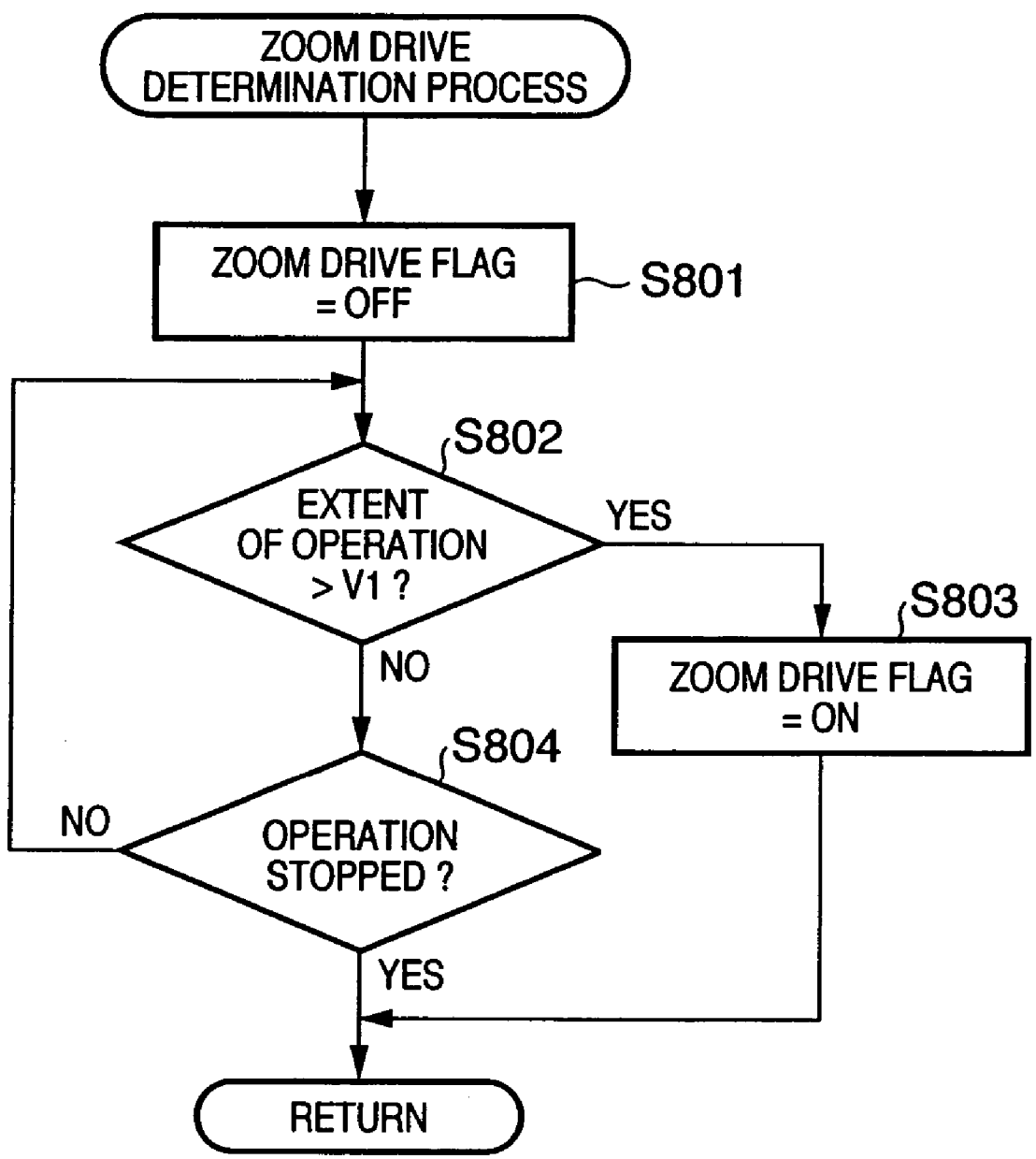
FIG. 8 is a flow chart showing details of a zoom drive determination process according to the second embodiment of the present invention.

FIG. 8 is a flow chart showing details of a zoom drive determination process according to the second embodiment of the present invention, specifically the zoom drive determination process performed in step S705.

First, in step S801, the zoom drive flag is initialized to OFF. Next, in step S802, it is determined whether or not an extent of operation since the start of operation of the zoom lever 105 has exceeded a preset reference operation extent V1, and, if the extent of operation has exceeded V1, in step S803 the zoom drive flag is turned ON, starting the zoom drive. It should be noted that, in the image sensing mode, it is necessary that the zoom operation respond speedily and sensitively to user operations in order not to miss a shot, and as a result it is preferable to set the reference operation extent V1 at a very small value. By contrast, if the extent of operation of the zoom lever 105 is stopped (YES in step S804) before the extent of operation since the start of operation of the zoom lever 105 exceeds the reference operation extent V1 (NO in step S802), then the zoom drive flag is left in the state in which it was set in step S801 (that is, OFF).

If as a result of the zoom drive determination process in step S705 described above the drive start conditions are satisfied, that is, if the zoom drive flag is ON (YES in step S706), then in step S707 the direction of operation of the zoom lever 105 is determined. If the direction of operation of the zoom lever 105 is in the telephoto direction, then processing proceeds to step S708 and the zoom position is moved to the telephoto side. If the direction of operation of the zoom lever 105 is in the wide-angle direction, then processing proceeds to step S709 and the zoom position is moved to the wide-angle side. It should be noted that, in steps S708 and S709, the zoom position is moved in response to the operation from the time when the zoom drive flag is turned ON (that is, from the time when the reference operation extent V1 is reached).

If in step S706 the drive start conditions are not satisfied, that is, if the zoom drive flag is OFF, then processing returns to step S701 without performing zoom drive.

If during zoom drive a halt in operation of the zoom lever 105 is detected (YES in step S710), then in step S712 the zoom drive is stopped. Also, if the zoom position reaches the telephoto end or the wide end (YES in step S711) without a halt in operation of the zoom lever 105 (NO in step S710), the process proceeds to step S712 and zoom drive is stopped.

Figure 9A:
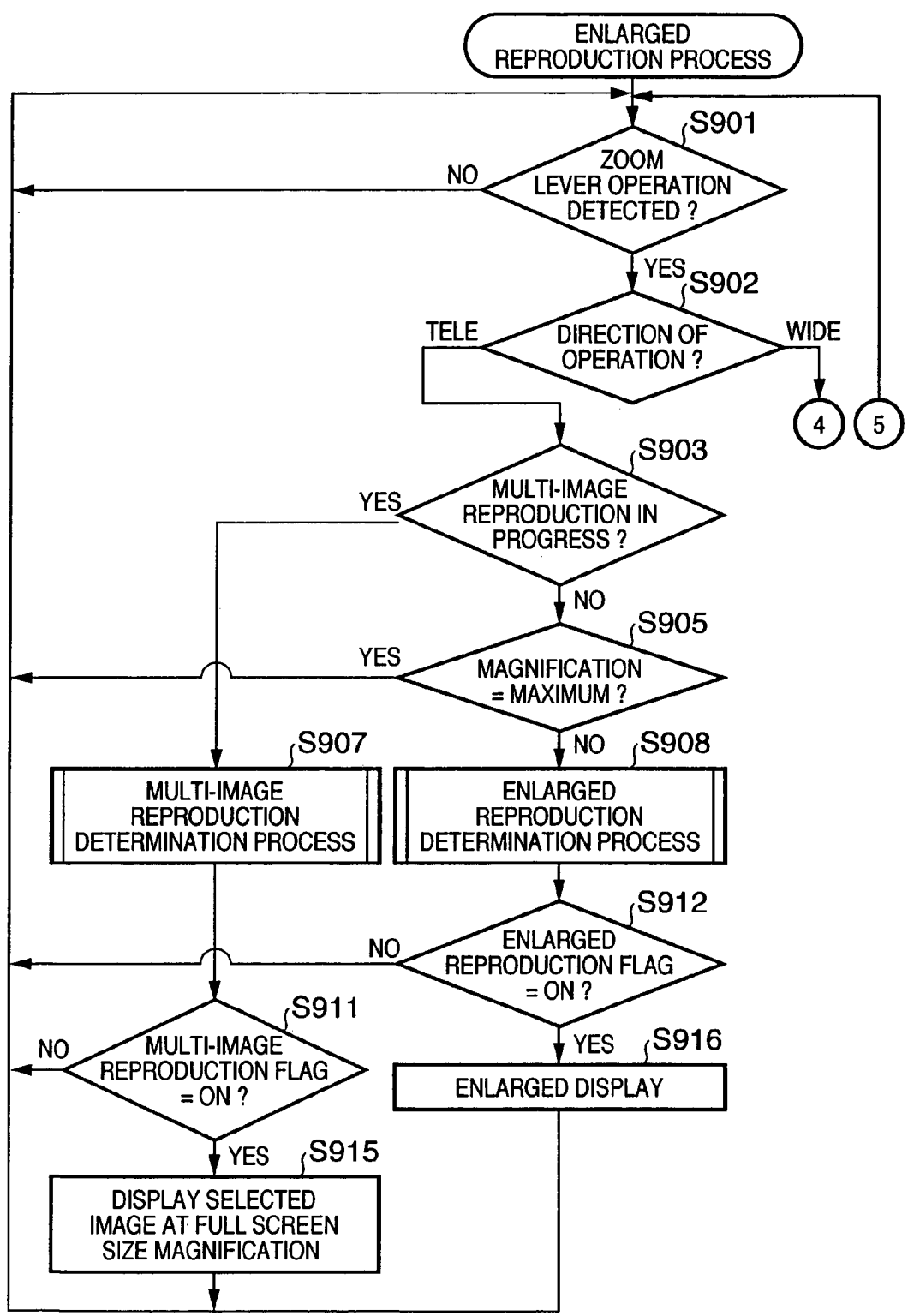
FIGS. 9A and 9B are flow charts showing the overall operation of an enlarged reproduction process in a reproduction mode according to the second embodiment of the present invention.
Figure 9B:
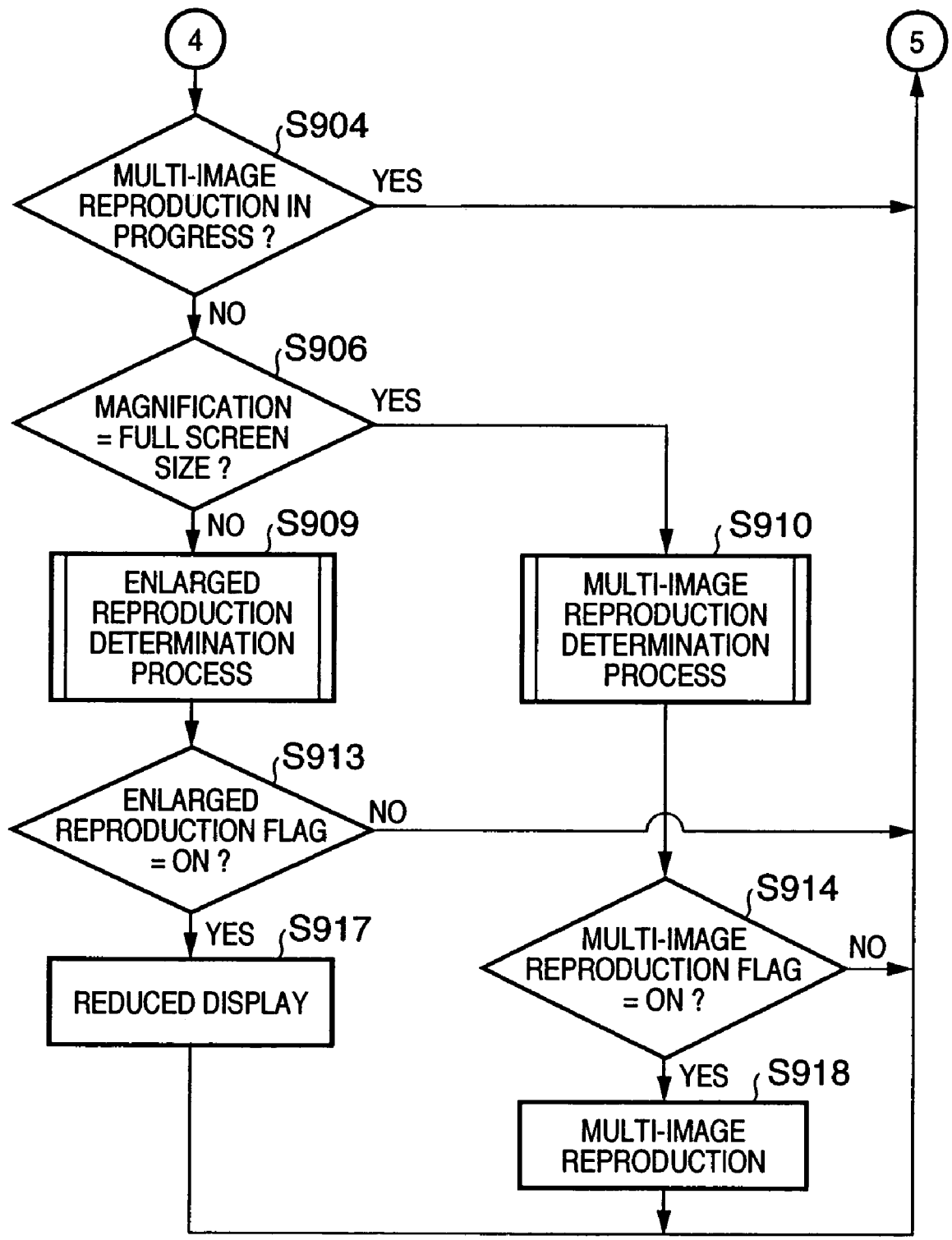

FIGS. 9A and 9B are flow charts showing the overall operation of an enlarged reproduction process in the reproduction mode according to the second embodiment of the present invention.

First, in step S901, the system controller 50 detects a start of operation of the zoom lever 105 based on the voltage value from the A/D converter 106. When the start of operation of the zoom lever 105 is detected, in step S902 the system controller 50 determines if the zoom lever 105 has been operated in the telephoto direction or in the wide-angle direction. If the zoom lever 105 has been operated in the telephoto direction, then processing proceeds to step S903. If the zoom lever 105 has been operated in the wide-angle direction, processing then proceeds to step S904. In either case, the system controller 50 then determines whether or not the apparatus is in the process of multi-image reproduction.

First, however, a description is given of the operation performed when the direction of operation is toward the telephoto side.

If in step S903 it is determined that the apparatus is not in the process of multi-image reproduction but is instead in the process of single-image display, then processing proceeds to step S905, where it is determined whether or not the magnification of the image being displayed is at maximum. If the magnification is at maximum, then processing returns to step S901 because further enlarged display is not possible. By contrast, if the image displayed is not at maximum magnification, then processing proceeds to step S908 and where the enlarged reproduction determination process is performed.

Figure 10:
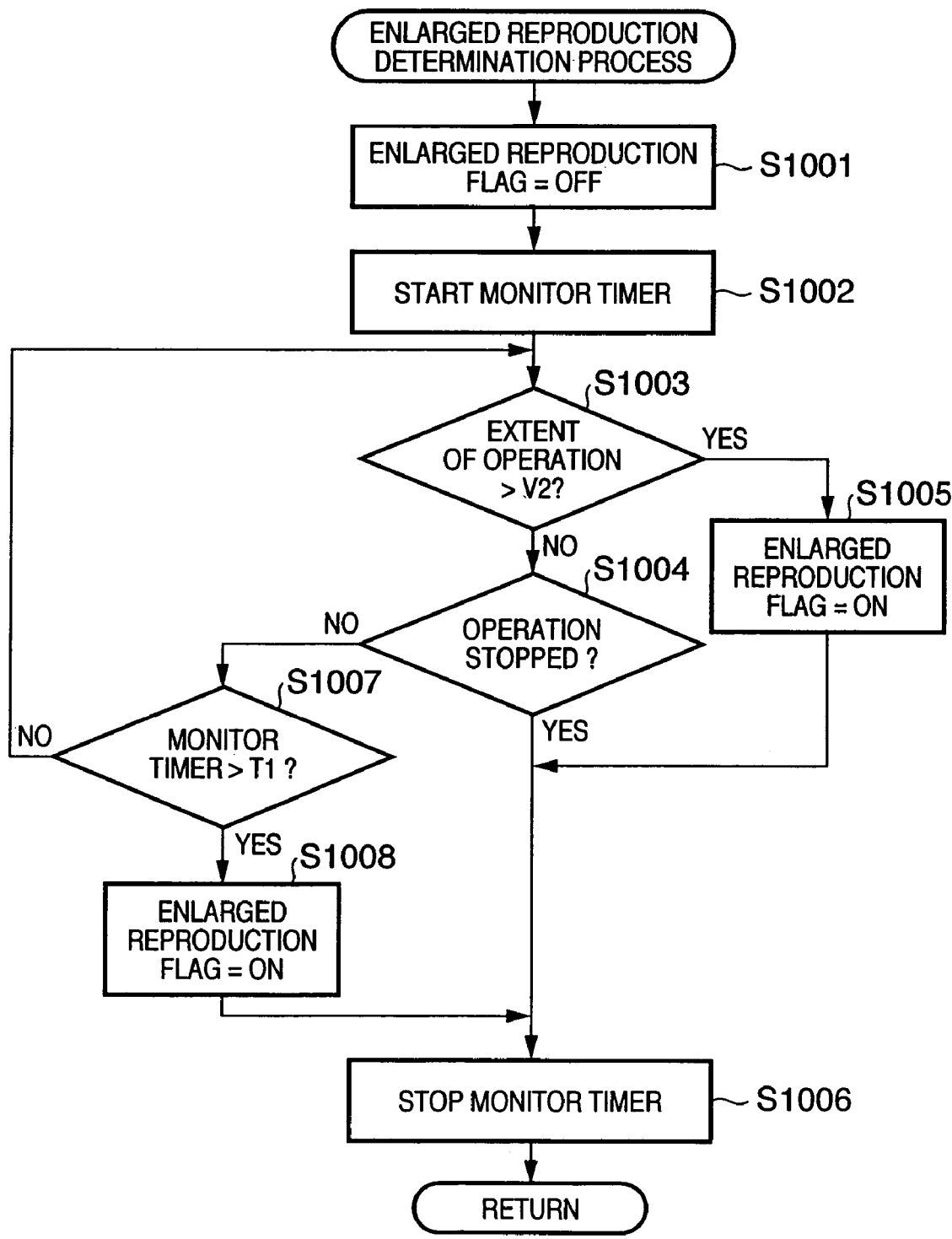
FIG. 10 is a flow chart showing details of an enlarged reproduction determination process according to the second embodiment of the present invention.

Here, a description is given of the enlarged reproduction determination process of the second embodiment performed in step S908, with reference to FIG. 10.

FIG. 10 is a flow chart showing details of an enlarged reproduction determination process according to the second embodiment of the present invention.

First, in step S1001, the enlarged reproduction flag is initialized to OFF. In step S1002, a monitor timer that measures a period of time since the start of operation of the zoom lever 1005 is started. Next, in step S1003, it is determined whether or not the extent of operation of the zoom lever 105 has exceeded a preset reference operation extent V2. If the extent of operation of the zoom lever 105 has exceeded the preset reference operation extent V2 (YES in step S1003), then the enlarged reproduction flag is set to ON so as to perform enlarged reproduction (step S1005). Processing is ended after the monitor timer is stopped in step S1006.

It should be noted that the reference operation extent V2 used in the enlargement determination process in the reproduction mode is set greater than the reference operation extent V1 used in the zoom drive determination process in the image sensing mode. The reason for such a setting arrangement is the same as that for setting the reference angle of rotation R2 greater than the reference angle of rotation R1 in the first embodiment described above.

By contrast, if the extent of operation of the zoom lever 105 is less than V2 (NO in step S1003), in step S1004 it is determined whether or not the operation of the zoom lever 105 has stopped. If the operation has not stopped, then in step S1007 it is determined whether or not the monitor timer has exceeded a preset time-out time T1, and, if not, processing returns to step S1003 and the detection of the extent of operation is repeated. By contrast, if the extent of operation of the zoom lever 105 has not exceeded the reference operation extent V2 within the time-out time T1 since the start of operation of the zoom lever 105 (NO in step S1003), and further, if the operation of the zoom lever 105 has stopped (YES in step S1004), then the enlarged reproduction determination process is ended after the monitor timer is stopped in step S1006. As a result, the enlarged reproduction flag set in step S1001 remains OFF.

Additionally, if the operation of the zoom lever 105 continues (NO in step S1004) and the monitor timer exceeds the time-out time T1 (YES in step S1007), then in step S1008 the enlarged reproduction flag is set to ON so as to perform enlarged reproduction. Thereafter, in step S1006, processing is ended after the monitor timer is stopped.

If as a result of the enlarged reproduction determination process in step S908 described above the drive start conditions are not satisfied (NO in step S912), that is, if the enlarged reproduction flag is OFF, then processing returns to step S901 without performing enlarged display.

By contrast, if the drive start conditions are satisfied, that is, if the enlarged reproduction flag is ON (YES in step S912), then in step S916 the reproduction image is JPEG expanded, enlarged and displayed, and processing returns to step S901. It should be noted that, in step S916, the enlargement magnification is determined according to the operation of the zoom lever 105 since the zoom drive flag was turned ON (that is, since reaching reference operation extent V2 or time-out time T1).

Additionally, if in step S903 it is determined that the apparatus is in multi-image reproduction, then in step S907 a multi-image reproduction determination process is performed.

Figure 11:
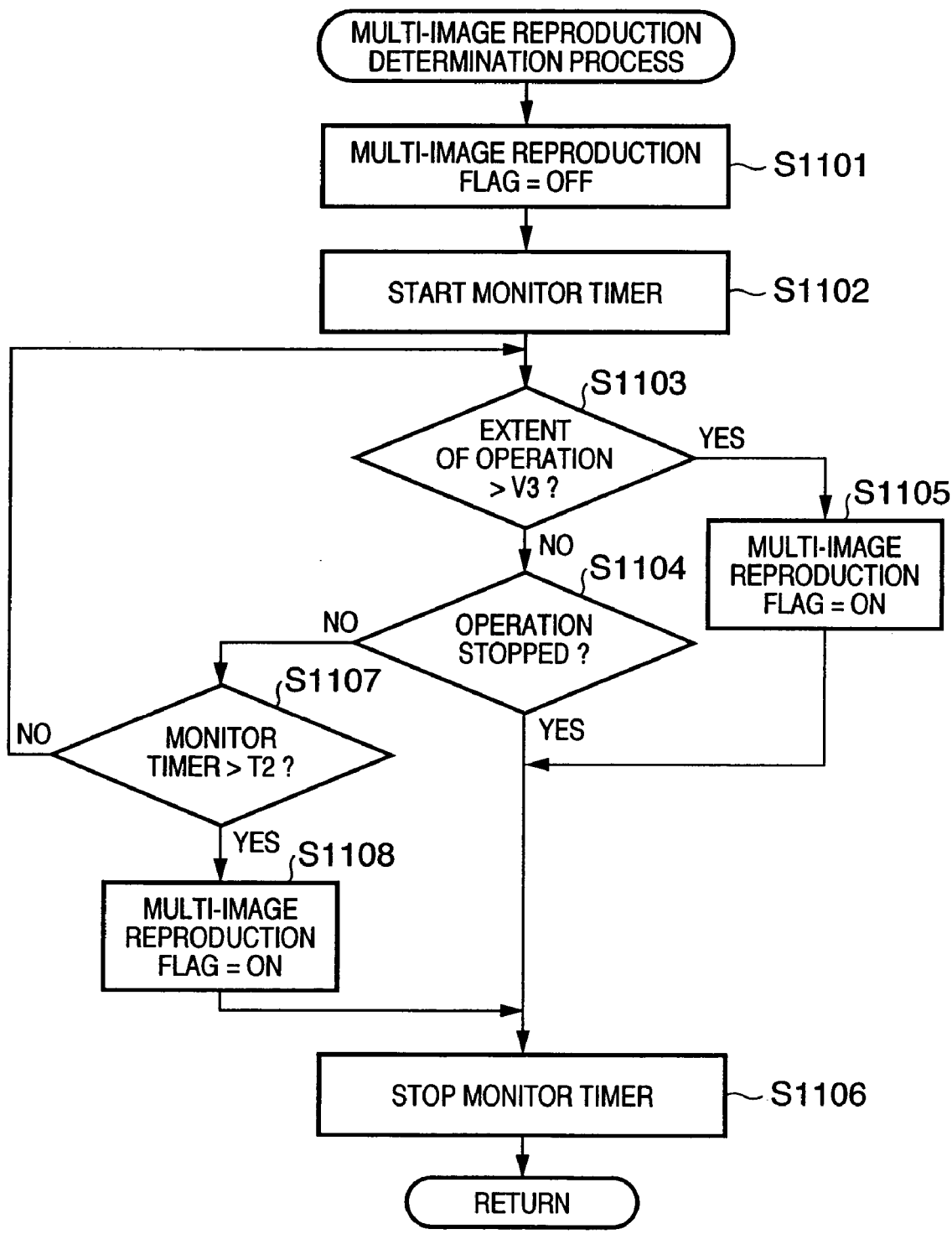
FIG. 11 is a flow chart showing details of a multi-image reproduction determination process according to the second embodiment of the present invention.

Here, a description is given of the multi-image reproduction determination process of the second embodiment performed in step S907, with reference to FIG. 11.

FIG. 11 is a flow chart showing details of a multi-image reproduction determination process according to the second embodiment of the present invention.

First, in step S1101, the multi-image reproduction flag is initialized to OFF. In step S1102, a monitor timer that measures a period of time since the start of operation of the zoom lever 105 is started. Next, in step S1103, it is determined whether or not the extent of operation of the zoom lever 105 has exceeded a preset reference operation extent V3. If the extent of operation of the zoom lever 105 has exceeded the preset reference operation extent V3 (YES in step S1103), then the multi-image reproduction flag is set to ON (step S1105) so as to perform enlarged reproduction. In step S1106, processing is ended after the monitor timer is stopped.

By contrast, if the extent of operation of the zoom lever 105 is less than V3 (NO in step S1103), then in step S1104 it is determined whether or not the operation of the zoom lever 105 has stopped. If the operation has not stopped, then in step S1107 it is determined whether or not the monitor timer has exceeded a preset time-out time T2, and, if not, processing returns to step S1103 and the detection of the extent of operation is repeated. By contrast, if the extent of operation of the zoom lever 105 has not exceeded the reference operation extent V3 within the time-out time T2 since the start of operation of the zoom lever 105 (NO in step S1103), and further, if the operation of the zoom lever 105 has stopped (YES in step S1104), then the multi-image reproduction determination process is ended after the monitor timer is stopped in step S1106. As a result, the multi-image reproduction flag set in step S1101 remains OFF.

Additionally, if the operation of the zoom lever 105 continues (NO in step S1004) and the monitor timer exceeds the time-out time T2 (YES in step S1107), then in step S1108 the multi-image reproduction flag is set to ON so as to perform enlarged reproduction. Processing is ended after the monitor timer is stopped in step S1106.

If as a result of the multi-image reproduction determination process in step S907 described above the drive start conditions are not satisfied (NO in step S911), that is, if the multi-image reproduction flag is OFF, then processing returns to step S901 without performing single-image display.

By contrast, if the drive start conditions are satisfied, that is, if the multi-image reproduction flag is ON (YES in step S911), then in step S915, of the plurality of images being displayed during multi-image reproduction, an image being selected is displayed at full screen size magnification and processing returns to step S901.

Next, a description is given of a case in which the results of the determination made in step S902 indicate that the direction of operation is in the wide-angle direction.

If it is determined in step S904 that the apparatus is in multi-image reproduction, then processing returns to step S901. On the other hand, if it is determined that the apparatus is not in multi-image reproduction, in other words, that the apparatus is in single-image display, then processing proceeds to step S905, where it is determined if the image being displayed is at full screen size magnification. If the display is not at full screen size magnification, then processing proceeds to step S909 and the enlarged reproduction determination process described above with reference to FIG. 10 is performed. If the display is at full screen size magnification, then processing proceeds to step S910 and the multi-image reproduction determination process described above with reference to FIG. 11 is performed.

If as a result of the enlarged reproduction determination process in step S909 described above the drive start conditions are not satisfied (NO in step S913), that is, if the enlarged reproduction flag is OFF, processing returns to step S901 without performing reduced display.

By contrast, if the drive start conditions are satisfied, that is, if the enlarged reproduction flag is ON (YES in step S913), then in step S917 a reduced display of reproduction images is performed and processing returns to step S901. It should be noted that, in step S917, the magnification is determined according to the operation since the zoom drive flag is turned ON (that is, since reaching either the reference operation extent V2 or the time-out time T1).

If as a result of the multi-image reproduction determination process in step S910 the drive start conditions are not satisfied (NO in step S914), that is, if the multi-image reproduction flag is OFF, then processing returns to step S901 without performing multi-image reproduction.

On the other hand, if the drive start conditions are satisfied, that is, if the multi-image reproduction flag is ON (YES in step S914), then processing proceeds to step S915, multi-image reproduction is performed, and processing then returns to step S901.

According to the second embodiment described above, by setting the reference operation extent V1 of the zoom lever 105 at a very small value in the image sensing mode, the driving of the zoom can be started promptly in response to the operation of the zoom lever 105. At the same time, by determining that enlarged reproduction is to be performed if in the reproduction mode the extent of operation of the zoom lever 105 has exceeded a set operation extent (V2, where V2>V1), or if the zoom lever 105, though minimally operated, is nevertheless continuously operated for a predetermined period of time or more (that is, T1), the possibility that the user might perform an unintentional enlarged display if the zoom lever 105 is inadvertently moved can be reduced.

Further, by configuring the apparatus so that the apparatus determines that it is permissible to switch between multi-image reproduction display and single-image display if the zoom lever 105 is operated beyond a certain extent (that is, V3, where V3>V2), or if the zoom lever 105, though minimally operated, is nevertheless continuously operated for a predetermined period of time or more (that is, T2, where T2>T1), the possibility that the user might perform an unintentional switching between multi-image reproduction and single-image display can be reduced.

It should be noted that although in the second embodiment described above the image sensing mode determination logic (FIG. 7), the reproduction mode enlarged reproduction determination logic (FIG. 10) and the multi-image reproduction determination logic (FIG. 11) are separate, alternatively a single determination logic may be used and different values for each mode may be used for the reference operation extent and monitor timer.

Additionally, although in the second embodiment described above the reproduction mode determination logic (FIG. 10) and the multi-image reproduction determination logic (FIG. 11) are the same, with different values used for the reference operation extent and monitor timer, alternatively, the determination logic may be different.

Additionally, although in the second embodiment described above the zoom drive is provided or not depending on the extent of operation of the zoom lever even in the image sensing mode, alternatively such operation may not be performed in the image sensing mode.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus having an image sensing mode for electrically sensing an object and storing acquired image data on a storage medium and a reproduction mode for reproducing and displaying the stored image, the apparatus comprising:

a switch for selecting the image sensing mode or the reproduction mode;

a changing unit for designating an angle of view of an image to be sensed during the selected image sensing mode and a magnification of an image to be displayed during the selected reproduction mode;

a control unit that, during the selected reproduction mode, maintains the magnification of the image at a value that exists prior to a start of operation of said changing unit from the start of operation until an extent of operation of said changing unit exceeds a preset first threshold value, and changes the magnification of the image depending on the extent of operation if the first threshold value is exceeded, and during the selected image sensing mode, maintains the angle of view of an image at the value that exists prior to the start of operation of said changing unit from the start of operation until the extent of operation of said changing unit exceeds a preset second threshold value, and changes the angle of view of the image depending on the extent of operation if the second threshold value is exceeded; and a display unit that displays a reproduction image at a magnification changed by said control unit during the selected reproduction mode and displays an object image acquired at an angle of view changed by said control unit during the selected image sensing mode, wherein the first threshold value is greater than the second threshold value.

2. The image sensing apparatus according to claim 1, wherein said control unit, if the extent of operation of said changing unit does not exceed the first threshold value within a preset period of time, maintains the magnification of the image at the value prior to the start of operation of said changing unit until the extent of operation exceeds a preset third threshold value that is greater than the first threshold value.

3. The image sensing apparatus according to claim 1, wherein said control unit maintains the magnification of the image at the value that existed prior to the start of operation of said changing unit until either the extent of operation of said changing unit exceeds the first threshold value or a period of time through which said changing unit is continuously operated exceeds a preset period of time.

4. The image sensing apparatus according to claim 1, wherein said control unit, during the selected image sensing mode, if the extent of operation of said changing unit does not exceed the second threshold value within a preset period of time, maintains the angle of view of the image that existed prior to the start of operation of said changing unit until the extent of operation of said changing unit exceeds a preset fourth threshold value that is greater than the second threshold value.

5. The image sensing apparatus according to claim 1, wherein said control unit, during the selected image sensing mode, maintains the angle of view of the image that existed prior to the start of operation of said changing unit until either the extent of operation of said changing unit exceeds the second threshold value or a period of time through which said changing unit is continuously operated exceeds a preset period of time.

6. The image sensing apparatus according to claim 1 further comprising a zoom lens,
   wherein said changing unit includes a zoom ring for driving said zoom lens and a ring rotation detection unit for detecting an amount of rotation of the zoom ring,
   the extent of operation of said changing unit being the amount of rotation of the zoom ring.

7. The image sensing apparatus according to claim 1, wherein said changing unit is an operation member adapted to detect an extent of operation from a center position,
   the extent of operation of said changing unit being the extent of operation from the center position of said changing unit.

8. The image sensing apparatus according to claim 1 further comprising:
   an enlargement designation unit for designating enlargement of an image displayed on said display unit during the selected reproduction mode; and
   a reduction designation unit for designating reduction of an image displayed on said display unit during the selected reproduction mode,
   wherein said display unit, during the selected reproduction mode, is adapted to display one image on a single display screen in a first display method and to display a plurality of images on the single display screen in a second display method,
   said display unit switching to the first display method to display a reproduction image when said enlargement designation unit is operated while images are being displayed according to the second display method, and changing to a designated magnification to display a reproduction image with a maximum magnification as a limit at all other times,
   said display unit switching to the second display method when said reduction designation unit is operated while an image is being displayed at full screen size magnification according to the first display method, and changing to a designated magnification to display a reproduction image with a full screen size magnification as a limit at all other times.

9. The image sensing apparatus according to claim 1, wherein:
   said display unit, during the selected reproduction mode, is adapted to display one image on a single display screen in a first display method and to display a plurality of images on the single display screen in a second display method;
   when magnification enlargement is designated by said changing unit and said display unit is displaying images according to the second display method during the selected reproduction mode, said control unit maintains to display images according to the second display method when the extent of operation of said changing unit is less than a preset fifth threshold value and changes to the first display method when the fifth threshold value is exceeded;
   when magnification reduction is designated by said changing unit and said display unit is displaying an image at full screen size magnification according to the first display method during the selected reproduction mode, said control unit maintains the magnification of the image at the value that existed prior to the start of operation of said changing unit when the extent of operation of said changing unit is less than the fifth threshold value and changes to the second display method when the fifth threshold value is exceeded; and
   the fifth threshold value being different from the first threshold value of the reproduction mode.

10. The image sensing apparatus according to claim 9, wherein said control unit maintains the magnification of the image at the value prior to the start of operation of said changing unit until a preset sixth threshold value that is greater than the fifth threshold value is exceeded if the extent of operation of said changing unit does not exceed the fifth threshold value with a preset period of time.

11. The image sensing apparatus according to claim 9, wherein said control unit maintains the magnification of the image at the value that existed prior to the start of operation of said changing unit until either the extent of operation of said changing unit exceeds the fifth threshold value or the amount of time through which said changing unit is continuously operated exceeds a preset period of time.

12. A method of controlling an image sensing apparatus having a switch for selecting an image sensing mode for electrically sensing an object and storing acquired image data on a storage medium or a reproduction mode for reproducing and displaying the stored image, a view angle changing unit for setting an angle of view of an image to be sensed during the selected image sensing mode and for setting a magnification of an image to be displayed during the selected reproduction mode, and a display unit that displays a reproduction image, the control method comprising:
   determining which of the image sensing mode and the image reproduction mode is selected;
   detecting an operating state of the view angle changing unit;
   during the selected reproduction mode, maintaining the magnification of the image at a value that existed prior to a start of operation of the changing unit from the start of operation until an extent of operation of the changing unit exceeds a preset first threshold value, and changing a magnification of the image depending on the extent of operation when the first threshold value is exceed;
   displaying a reproduction image at the display unit at the controlled magnification during the selected image sensing mode, the angle of view of the image is maintained at the value that existed prior to the start of operation of the changing unit from the start of operation until the extent of operation of the changing unit exceeds a preset second threshold value, and the angle of view of the image is changed depending on the extent of operation if the second threshold value is exceeded; and
   displaying an object image acquired at the controlled angle of view,
   wherein the first threshold value used during the selected reproduction mode is greater than the second threshold value used during the selected image sensing mode.

13. The control method according to claim 12, wherein in said controlling, if the extent of operation of the changing unit does not exceed the first threshold value within a preset period of time, the magnification of the image is maintained at the value that existed prior to the start of operation of the changing unit until the extent of operation exceeds a preset third threshold value that is greater than the first threshold value.

14. The control method according to claim 12, wherein in said controlling, the magnification of the image is maintained at the value that existed prior to the start of operation of the changing unit until either the extent of operation the changing unit exceeds the first threshold value or a period of time through which the changing unit is continuously operated exceeds a preset period of time.

15. The control method according to claim 12, wherein in said controlling, during the selected image sensing mode, if the extent of operation of the changing unit does not exceed the second threshold value within a preset period of time, the angle of view of the image prior to the start of operation of the changing unit is maintained until the extent of operation exceeds a preset fourth threshold value that is greater than the second threshold value.

16. The control method according to claim 12, wherein in said controlling, during the image sensing mode, the angle of view of the image prior to the start of operation of the changing unit is maintained until either the extent of operation of the changing unit exceeds the second threshold value or a period of time through which the changing unit is continuously operated exceeds a preset period of time.

17. The control method according to claim 12, wherein the image sensing apparatus further comprises a zoom lens, and wherein the changing unit includes a zoom ring for driving the zoom lens and a ring rotation detection unit for detecting an amount of rotation of the zoom ring, the extent of operation being the amount of rotation of the zoom ring.

18. The control method according to claim 12, wherein the changing unit of the image sensing apparatus is a control member adapted to detect an extent of operation from a center position, the extent of operation of the changing unit being the extent of operation from the center position of the changing unit.

19. The control method according to claim 12, wherein the image sensing apparatus further comprises:

an enlargement designation unit for designating enlargement of an image displayed in said displaying during the selected reproduction mode; and a reduction designation unit for designating reduction of an image displayed in said displaying during the selected reproduction mode, and wherein the display unit, during the selected reproduction mode, is adapted to display one image on a single display screen in a first display method and to display a plurality of images on the single display screen in a second display method, the control method further comprising:

switching to the first display method to display a reproduction image when the enlargement designation unit is operated while images are being displayed according to the second display method, or changing to a designated magnification to display a reproduction image with a maximum magnification as a limit at all other times; and switching to the second display method when the reduction designation unit is operated while an image is being displayed at full screen size magnification according to the first display method, and changing to a designated magnification to display a reproduction image with a full screen size magnification as a limit at all other times.

20. The control method according to claim 12, wherein the display unit, during the selected reproduction mode, is adapted to display one image on a single display screen in a first display method and to display a plurality of images on the single display screen in a second display method, the control method further comprising:

when magnification enlargement is designated by the changing unit and, in said displaying, images are displayed according to the second display method during the selected reproduction mode, the second display method is maintained when the extent of operation of the view angle changing unit is less than a preset fifth threshold value and changes to the first display method when the fifth threshold value is exceeded in said controlling; and when magnification reduction is designated by the view angle changing unit and, in said displaying, an image is displayed at full screen size magnification according to the first display method during the selected reproduction mode, the magnification of the image is maintained at the value that existed prior to the start of operation of the changing unit when the extent of operation of the changing unit is less than the fifth threshold value and the first display method is changed to the second display method when the fifth threshold value is exceeded in said controlling, the fifth threshold value being different from the first threshold value of the reproduction mode.

21. The control method according to claim 20, wherein in said controlling, the magnification of the image is maintained at the value that existed prior to the start of operation of the changing unit until a preset sixth threshold value that is greater than the fifth threshold value is exceeded if the extent of operation of the changing unit does not exceed the fifth threshold value with a preset period of time.

22. The control method according to claim 20, wherein in said controlling, the magnification of the image is maintained at the value that existed prior to the start of operation of the changing unit until either the extent of operation of the changing unit exceeds the fifth threshold value or the amount of time through which the changing unit is continuously operated exceeds a preset period of time.

\* \* \* \* \*